United States Patent [19]
Duncan et al.

[11] Patent Number: 5,825,873
[45] Date of Patent: Oct. 20, 1998

[54] INTERFACE FOR PROVIDING CALL CONTROL FOR A HEADSET ATTACHED TO A TELEPHONE PROVIDING CALL CONTROL FOR A HEADSET ATTACHED TO A TELEPHONE

[75] Inventors: Michael Glen Duncan, Austin; Geoffrey Findley, Pflugerville; Ronald Albert Kubena, Round Rock; Douglas F. Moellering, Pflugerville, all of Tex.

[73] Assignee: Siemens Business Communication Systems, Inc., Santa Clara, Calif.

[21] Appl. No.: 896,570

[22] Filed: Jul. 18, 1997

Related U.S. Application Data

[63] Continuation of Ser. No. 579,492, Dec. 27, 1995.
[51] Int. Cl.⁶ ..................................................... H04M 1/00
[52] U.S. Cl. .......................... 379/419; 379/399; 379/428; 379/442; 455/550; 455/403; 455/575; 455/90
[58] Field of Search ..................................... 379/399, 428, 379/442; 455/550, 403, 575, 90, 424, 556, 557, 558; D14/240, 241, 242, 138, 140, 142

[56] References Cited

U.S. PATENT DOCUMENTS

| | | | |
|---|---|---|---|
| 4,893,331 | 1/1990 | Horiuchi et al. | 379/442 |
| 4,907,267 | 3/1990 | Gutzmer | 379/442 |
| 5,455,859 | 10/1995 | Gutzmer | 379/442 |
| 5,524,047 | 6/1996 | Brown et al. | 379/442 |

*Primary Examiner*—Dwayne D. Bost
*Assistant Examiner*—Keith Ferguson

[57] ABSTRACT

A host telephone is connected by an interface to an accessory item. The accessory item is, for example, a cordless headset, a headset amplifier, a remote telephone dialing device, a cordless handset or some other device which is connected to a telephone. Two connectors are used to connect the host telephone to the interface. A first connector provides a standard headset connection to the host. The first connector propagates four signals: a transmit audio signal, a transmit return signal, a receive audio signal and a receive return signal. A second connector provides a propagation media for additional signals. The additional signals provide additional communication links between the host telephone and the accessory item.

18 Claims, 2 Drawing Sheets

INTERFACE FOR PROVIDING CALL CONTROL FOR A HEADSET ATTACHED TO A TELEPHONE PROVIDING CALL CONTROL FOR A HEADSET ATTACHED TO A TELEPHONE

CROSS-REFERENCE TO RELATED APPLICATION

This is a continuation of Ser. No. 08/579,492 filed Dec. 27, 1995.

BACKGROUND

The present invention concerns phone systems and pertains particularly to an interface between a telephone and a headset.

Connected between a telephone and a headset is typically a standard audio-only four wire interface. The standard audio-only four wire interface includes a wire dedicated to transmit audio-only, a wire dedicated to transmit return, a wire dedicated to receive audio-only and a wire dedicated to receive return.

With the advent of new wireless headset technologies, many users desire remote control capability for their telephone. The standard audio-only port as implemented on most telephones does not provide the capability that a mobile user requires.

Some telephones provide control ports which implement, for example, a telephony Application Programmer's Interface (API). Typically, however the current implementation of telephony API control ports are very expensive and require a complex phone configuration/setup and/or complex cabling. Each telephone has only a fixed function set. Additionally, each telephone vendor implements call control in a unique way.

SUMMARY OF THE INVENTION

In accordance with the preferred embodiment of the present invention, a host telephone is connected by an interface to an accessory item. The accessory item is, for example, a cordless headset, a headset amplifier, a remote telephone dialing device, a cordless handset or some other device which is connected to a telephone. Two connectors are used to connect the host telephone to the interface. A first connector provides a standard headset connection to the host. The first connector propagates four signals: a transmit audio signal, a transmit return signal, a receive audio signal and a receive return signal. A second connector provides a propagation media for additional signals. The additional signals provide additional communication links between the host telephone and the accessory item.

For example, one of the additional signals is a device presence signal. The device presence signal indicates to the host telephone an interface level. The interface level is determined by the functionality implemented by the accessory item.

When the device presence signal indicates a first interface level, the additional signals additionally include, for example, a power source signal, a hookswitch signal, and a discrete logic signal. The power source signal is used by the host telephone to supply power to the accessory item. The off-hook status signal originates from the accessory item and indicates to the host telephone a request for the accessory item to be placed in an off-hook state. The discrete logic signal is used by the host telephone to indicate a ring to the accessory item.

When the device presence signal indicates a second interface level, the additional signals include the power source signal, and a bi-directional serial communication link between the host telephone and the accessory item.

In the preferred embodiment of the present invention, the first connector is an RJ-8 style modular connector having four pins, and the second connector is an RJ-11 style modular connector having six pins. Alternately, various other media may be used to implement the data path through the second connector. For example, this data path could be implemented over an infrared media, radio frequency wireless media or using one of various hardware bus implementations such as Geoport or Universal Serial Bus (USB). Also, a level three may be added to allow the performance of functions such as remote dialing, faxing, file transfer, data backup and network access. In such cases, the accessory item could be implemented, for example, using a personal digital assistant (PDA), palm top personal computer, or personal organizer.

The present invention provides for a low-cost headset port with expandable levels of telephone and call control. The port is simple for users to install and set up and allows headset vendors implementing new headset technologies to take advantage of various phone features in a standard way.

DESCRIPTION OF THE PREFERRED EMBODIMENT

Figure 1:
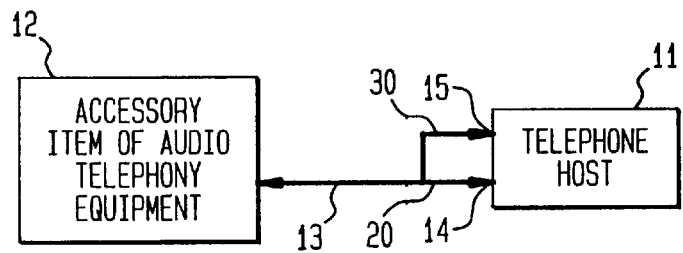
FIG. 1 is a block diagram, which illustrates connections between a telephone and an external accessory item of audio telephony equipment in accordance with a preferred embodiment of the present invention.

FIG. 1 shows a host telephone 11 connected to an accessory item of audio telephony equipment 12 through an interface 13. Interface 13 utilizes a connector receptor 14 and a connector receptor 15 at host telephone 11. A connector 20 of interface 13 is placed within connector receptor 14. A connector 30 of interface is placed within connector receptor 15. Accessory item 12 may consist of, for example, a headset or a headset system. A headset system is for example, a cordless headset, a headset amplifier, a remote telephone dialing device, a cordless handset or some other device which is connected to a telephone.

Interface 13 allows for both full duplex analog voice signal transmission and control of host telephone 11. In particular, interface 13 allows for on/off hook phone control by accessory item 12, with pre-defined growth to allow remote command of phone dialing and feature access, remote host phone status reporting and call data display.

In the preferred embodiment, interface 13 provides three levels of phone-to-accessory interface. At the lowest level, level zero, interface 13 is limited to audio signals only; no control of host telephone 11 is provided. At the next level, level one, interface 13 retains the level zero audio signals and adds limited control of host telephone 11 in the form of on/off switch-hook control and ring indication. In the next level, level two, accessory item 12 is able to utilize the capability for full control of phone dialing, answering, feature selection, and information display. When accessory item 12 implements level two, the combinations of features actually implemented can be varied depending upon the desired functionality of accessory item 12.

Figure 2:
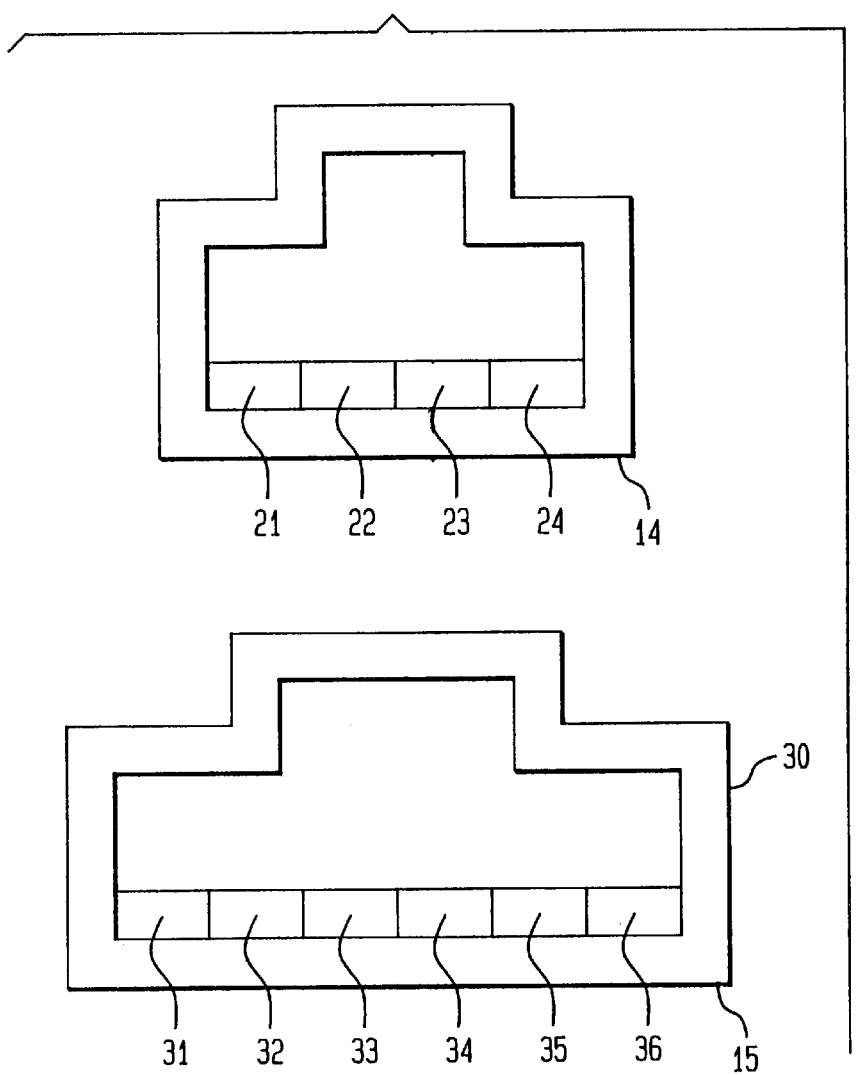
FIG. 2 shows connection diagrams for connector receptacles for a port which connects a headset to a telephone in accordance with the preferred embodiment of the present invention.

FIG. 2 shows details of connector receptor 14 and connector receptor 15. Connector receptor 14 is an RJ-8 style modular connector and has four pins: pin 21, pin 22, pin 23 and pin 24, as shown. Connector receptor 14 is used in all three levels of interface 13 and always carries the same audio signals.

Connector receptor 15 is an RJ-11 style modular connector and has six pins: pin 31, pin 32, pin 33, pin 34, pin 35 and pin 36, as shown. Table 1 below defines the functions of pins 21–24 of connector receptor 14 and pins 31–36 of connector receptor 16.

11 to accessory item 12. The signal on pin 22 is intended to drive the earphone(s) of a headset or similar device. In the preferred embodiment, the source impedance as presented on pin 22 at host telephone 11 is 200+/−10% Ohms. The maximum signal swing is +/−250 millivolt peak-to-peak (mVpp). Accessory item 12 presents to host telephone 11 3000+/−20% Ohms between pin 22 and receive return pin 23. Audio sensitivity of accessory item 12 is −40 decibel-pascals per volt (dBPa/V)+/−4.0 decibels (dB). These values apply for signals of 1 kilohertz (KHz). Host telephone 11 may use the signal on pin 22 to sense the presence of accessory item 12 by virtue of sensing the impedance placed by accessory item 12 between pin 22 and pin 23. Host telephone 11 uses a current of less than 0.5 milliamps (mA) to sense this impedance.

Pin 23 of connector receptor 14 carries a receive return signal which is a return for pin 22.

Pin 24 of connector receptor 14 carries an transmit audio signal which is an uplink signal from accessory item 12 to host telephone 11. The signal on pin 22 is intended to be sourced from an amplified electret headset microphone or similar device. The source impedance presented by acces-

TABLE 1

Connector Receptor 14:

| Usage | | | Pin number | Signal Name | Direction | Signal Description |
|---|---|---|---|---|---|---|
| Headset only Level 0 | Limited-control Accessory Level 1 | Full-control Accessory Level 2 | 21 | Tx return | n/a | Return for pin 24 |
| | | | 22 | Rx audio | downlink | Downlink audio |
| | | | 23 | Rx return | n/a | Return for pin 22 |
| | | | 24 | Tx audio | uplink | Uplink audio |

| Usage Level 0 | Level 1 | Level 2 | Pin number | Signal Name | Direction | Signal Description. |
|---|---|---|---|---|---|---|
| (Unused) | +5V | +5V | 31 | Vaux+ | downlink | Power supplied from host telephone 11 |
| Ring Discrete | (Ring plus hook sense discrete) | Serial Data Out | 32 | Downlink Control | downlink | RX downlink serial data or discrete logic signal |
| Reserved | Hookswitch Control | Serial Data In | 33 | Uplink Control | uplink | Tx uplink serial data or discrete logic signal |
| (Unused) | Ground | Ground | 34 | Vaux return | n/a | Return for pin 33 and signal reference for logic data |
| (Unused) | Device Presence (22 kilohms to ground) | Device Presence 0 Ohm to Ground | 35 | Device presence | uplink | Pre-defined impedance level indicating accessory device presence |
| Audio | Audio | Audio | 36 | Second Channel Audio | downlink | For attachment of stereo headsets |

As shown in Table 1 above, pin 21 of connector receptor 14 carries a transmit (Tx) return, which is a return for pin 24.

Pin 22 of connector receptor 14 carries a receive (Rx) audio signal, which is a downlink signal from host telephone sory item is 50+/−20% Ohms. Host telephone 11 proves a DC bias on pin 22 of a 10 kilohm+/−resistive pull-up to 5 volts DC+/−10%. The load impedance presented by host telephone 11 are greater than 8 kilohms. Maximum signal swell is no more than +/−600 mVpp. Audio sensitivity of accessory item 12 is −28 decibel-volts per pascal (dBV/Pa) +/−4.0 dB. These values apply for signals of 1 kilohertz (KHz). Signal characteristics for signals on pins 21, 22, 23 and 24 remain the same at each level of operation of interface 13.

Pin 31 of connector receptor 15 carries a Vaux+ signal which provides power from host telephone 11 to accessory item 12. The nominal characteristics of the power provided on pin 31 is 5 volts DC at 30 mA steady state and 100 mA peak current capability. Regulation for this supply is no worse than +/−10% under all static conditions.

Pin 32, in level 0 usage, carries a ring indication. The logic level ring signal matches the cadence ring of the phone. The true condition indicates ringing.

Pin 32, in level 1 usage, carries a ring/hook sense indication. The logic level ring signal matches the cadence ring of the phone. The true condition indicates ringing. In addition, the signal on pin 32 is true when the phone is active (i.e., off hook). The signal of pin 32 is used in level 1, for example, by an attached device to enable its downlink audio path.

Pin 32 of connector receptor 15, in level 2 usage, carries a downlink control signal which is a data link by which host telephone 11, in level 2 implementations, transmits data to accessory item 12. In the preferred embodiment, the data link is an independent 0–5 volt nominal, 2400 baud, 1 start (logic 0), 8 data (least significant bit (LSB) first, positive logic), 1 stop (logic 1), no parity, asynchronous serial data link. When no transmission is occurring, the signal on pin 36 is maintained at logic 1.

For signals on pins 32, 33 and 35 a signal is a positive logic with a "true" or logic 1 condition being defined as (0.7×Vaux+) to 5.5 volts with respect to the Vaux return signal on pin 34. The "false" or logic 0 condition is indicated by 0.0 to −0.5 volts present on connector pin 32 with respect to the Vaux return signal on pin 34. Load impedance as presented on the side of accessory item 12 is at least 20 kilohms.

Pin 33, in level 0 usage, is reserved for proprietary phone functions.

Pin 33, in level 1 usage, carries a hookswitch control signal. This signal from accessory item 12 indicates to host telephone 11 that accessory item 12 is requesting that host telephone 11 be placed in an off-hook state. The true condition is an off-hook state. That is, when accessory item 12 places pin 33 in the true (logic 1) state, this indicates to telephone 12 that accessory item 12 is requesting that telephone 12 be placed in the off-hook state. The signal is monitored by host telephone 11 only when both the signal on pin 22 and the signal on line 35 indicate accessory item 12 is present and usage is at level 1.

Pin 33 of connector receptor 15, in level 2 usage, carries a uplink control signal which is a data link by which accessory item 12, in level 2 implementations, transmits data to host telephone 11. In the preferred embodiment, the data link is an independent 0–5 volt nominal, 2400 baud, 1 start (logic 0), 8 data (least significant bit (LSB) first, positive logic), 1 stop (logic 1), no parity, asynchronous serial data link. When no transmission is occurring, the signal on pin 32 is maintained at logic 1. Table 2 below indicates commands in one preferred embodiment which are transmitted as the uplink control signal. The below listed commands are based on the standard Hayes AT command set, with only minor variations.

TABLE 2

| Command Received | Action | Response |
|---|---|---|
| AT | None | OK |
| A/ | Repeat last command string. | Dependent |
| ATDx <dial string> or AT*D | Saves digits in buffer, force phone off hook, dial digits through phone. (x=P, T, or null. | CONNECT |
| ATH or AT%H ATH0 AT*H | Hang up call - If in hookswitch mode, go on hook, if in speakerphone or headset mode, go off hook, then on hook. | OK |
| ATH1 | Go off hook. | OK |
| ATA AT*A | Go off hook if VCR is indicating a ring state. | OK |
| ATIx | None (x=0 or 1). Request for product information. | Dependent on Host device |
| ATV | Set flag for sending number results instead of words. | OK |
| ATZ | Reset flags, hang-up call. | OK |
| ATE1/0 | Turns on or off echo-back of characters. | OK |
| ATQ1/0 | Turns on or off "quiet" mode - in quiet mode, no result codes are sent. | OK |
| ATC, ATO, ATP, ATR, ATSnn=nn, ATT, ATX | None | OK |
| AT (else) | None | ERROR |

Pin 34 of connector receptor 15 carries a Vaux return signal which is a return for pin 31. Pin 34 is isolated from pin 21 and 23 by at least 10 kilohm within accessory item 12.

Pin 35 of connector receptor 15 carries a device presence signal which is used by accessory item 12 in level 1 and level 2 implementations to indicate to host telephone 11 the presence of accessory item 12. In order to indicate a level 1 interface, 22+/−2% kilohm is present between pin 35 and pin 34. The impedance is provided by accessory item 12 and sensed by host telephone 11. An impedance of greater then 50 kilohm between pin 35 and pin 34 is interpreted by host telephone 11 as either a level 0 interface or device absent, depending on the impedance of receive audio line (pin 22). An impedance of 0 kilohm between pin 35 and pin 34 is interpreted by host telephone 11 to indicate a level 2 interface. In the preferred embodiment, telephone 12 places a voltage of 5 volts DC+/−10% with a source impedance of 50+/−2% kilohms (or approximately 0 ohm), as an indication that accessory item 12 is connected to a host telephone capable of supporting a level 1 or a level 2 interface.

Pin 36 of connector receptor 15 is a second channel audio link and is used, for example, for the attachment of stereo headsets.

The uplink control signal on pin 33 and the downlink signal on pin 32 are used in level 2 interfaces to provide a phone API, or other connection interface between host telephone 11 and accessory item 12. This allows features such as phone dialing, public branch exchange (PBX) feature access, phone feature key setup, display monitoring and phone LED monitoring. If a phone API is utilized, this is implemented, for example, using a protocol standard such as the Microsoft TAPI standard, the Novell TSAPI standard, ROLM's Workstation protocol or some other standard protocol.

In alternate embodiments of the present invention, The uplink control signal on pin 33 and the downlink control signal on pin 32 may each be used to carry a single discrete logic signal.

As discussed above, when accessory item 12 is a level 1 device, host telephone 11 provides a logic signal on the ring/hook sense signal on pin 32 and a buzz tone on the receive audio signal on pin 22 in response to a ring command (incoming call) received over the network at host telephone 11. The buzz tone on pin 22 consists of a 1 KHz, 50% duty cycle, square wave of 25 mVpp amplitude, modulated in a one second on, one second off cadence. The discrete line indicates the reception of a ring command by providing a logic 1. Both ring indications are removed only in response to a ring cease command received by host telephone 11. When accessory item 12 is a level 0 device, only the buzz tone on pin 22 is asserted by host telephone 11 in response to a ring command (incoming call) received over the network at host telephone 11.

While FIG. 2 shows connector 15 of interface 13 implemented using an RJ-11 style modular connector which has six pins, various other media may be used to implement the data path to host telephone 11 which flows through connector 15. For example, this data path could be implemented over an infrared media, radio frequency wireless media or using one of various hardware bus implementations such as Geoport or Universal Serial Bus (USB). Using the implementation shown in FIG. 2 or one of the additionally suggested media, a level three may be added to allow the performance of functions such as faxing, file transfer, data backup and network access. In such cases, accessory item 12 could be implemented, for example, using a personal digital assistant (PDA), palm top personal computer, or personal organizer.

Figure 3:
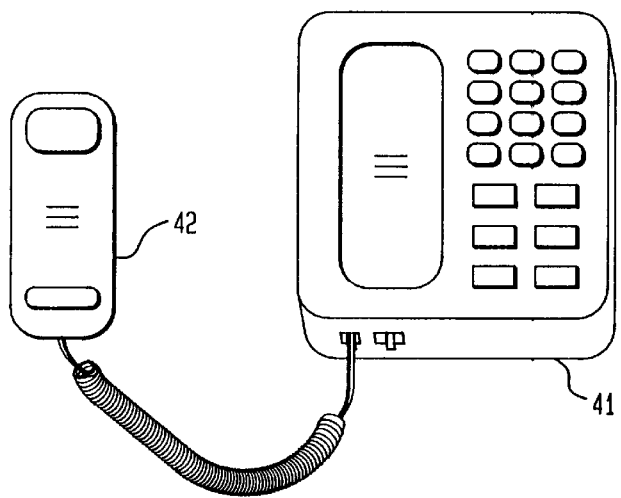
FIG. 3 illustrates a standard audio/only connection of a headset to a telephone using a port in accordance with the preferred embodiment of the present invention.

FIG. 3 shows the level 0 connection of a standard audio/only headset 42 to a host telephone 41. Because this is a standard (level 0) connection, only a standard four pin receptor is used in the connection.

Figure 4:
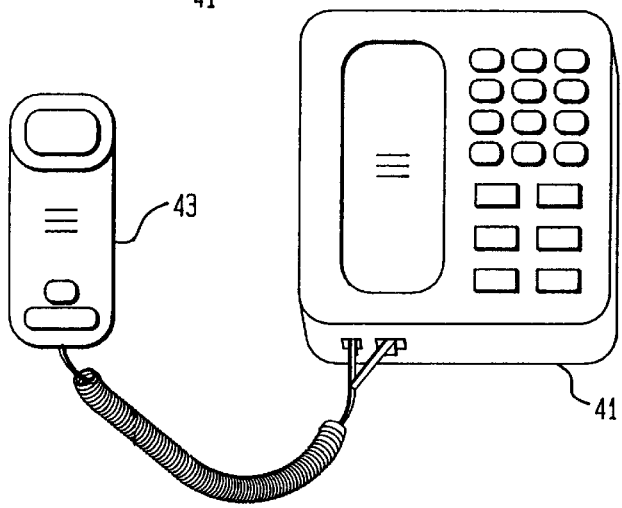
FIG. 4 illustrates connection of an enhanced headset to a telephone using a port in accordance with the preferred embodiment of the present invention.

FIG. 4 shows the level 1 connection of an enhanced headset 43 to host telephone 41. Because this is a level 1 connection, both a standard four pin receptor and an additional six pin receptor is used. As described above, additional functionality implemented in the interface between enhanced headset 43 and host telephone 41 includes a power source supplied from host telephone 41, a logic level discrete signal from headset 43 to host telephone 41 indicating a headset 43 hookswitch request and a discrete logic signal by which host telephone 41 indicates a ring to headset 43. Headset 43 also presents a pre-defined impedance level indicating the presence of headset 43 and that headset 43 operates at level 1. Also implemented is a second audio channel.

Figure 5:
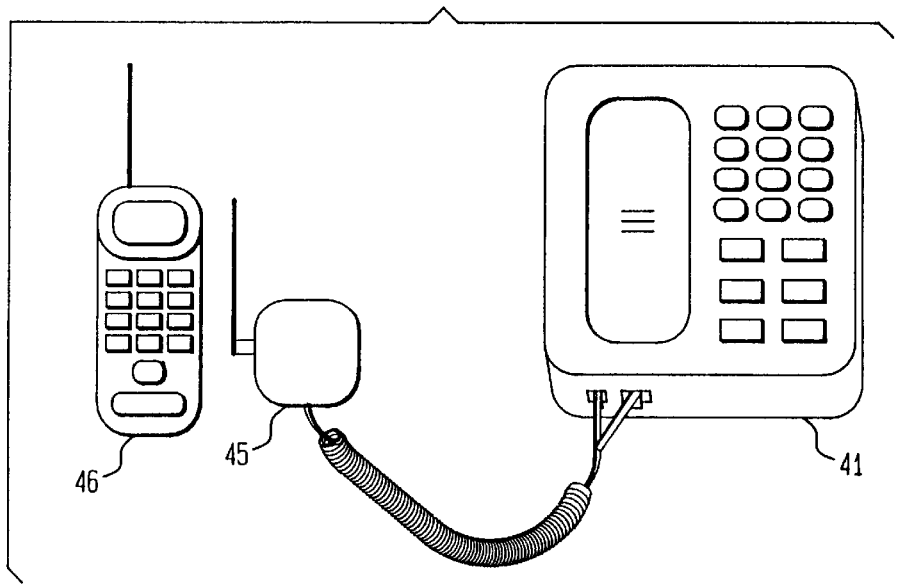
FIG. 5 illustrates connection of a base station for a full featured remote headset to a telephone using a port in accordance with the preferred embodiment of the present invention.

FIG. 5 shows the level 2 connection of a remote headset base station 45 to host telephone 41. Remote headset base station 45 communicates to a remote headset 46 through a wireless communication medium. In the level 2 connection between remote headset base station 45 and host telephone 41, both a standard four pin receptor and an additional six pin receptor is used. As described above, additional functionality implemented in the interface between remote headset base station 45 and host telephone 41 includes a power source supplied from host telephone 41 and a bi-directional serial communication path between host telephone 41 and remote headset base station 45. Remote headset base station 45 also presents a pre-defined impedance level indicating the presence of remote headset base station 45 and that remote headset base station 45 operates at level 2. Also implemented is a second audio channel.

What is claimed is:

1. A telephone system comprising:
  a host telephone;
  an accessory item; and
  an interface which couples the host telephone to the accessory item, the interface including
    first connector which connects the interface to the host telephone, the first connector transmitting four signals between the host telephone and the accessory item, the four signals comprising a transmit audio signal, a transmit return signal, a receive audio signal and a receive return signal, and
    second connector which connects the interface to the host telephone, the second connector transmitting one or more additional signals between the host telephone and the accessory item via at least one additional communication link.

2. A telephone system as in claim 1 wherein the additional signals include a device presence signal, the device presence signal indicating to the host telephone an interface level, the interface level being determined by the functionality implemented by the accessory item.

3. A telephone system as in claim 2 wherein when the device presence signal indicates a first interface level, the additional signals additionally include:
  a power source signal by which the host telephone supplies power to the accessory item;
  a hookswitch signal originating from the accessory item which indicates to the host telephone a request for the accessory item to be placed in an off-hook state; and,
  a discrete logic signal by which the host telephone indicates a ring to the accessory item.

4. A telephone system as in claim 3 wherein when the device presence signal indicates a second interface level, the additional signals additionally include:
  the power source signal by which the host telephone supplies power to the accessory item; and
  a bi-directional serial communication link between the host telephone and the accessory item.

5. A telephone system as in claim 1 wherein the first connector is an RJ-8 style modular connector having four pins, and the second connector is an RJ-11 style modular connector having six pins.

6. A telephone system as in claim 1 wherein the additional signals include an audio channel for the attachment of stereo headsets.

7. In a telephone system in which a host telephone is connected by an interface to an accessory item, the host telephone having a first connector receptacle and a second connector receptacle, a method by which the host telephone and the accessory item communicate, the method comprising the following steps:
  (a) when a first connector is present in the first connector receptacle, communicating between the host telephone and the accessory item using four signals propagated through the first connector, the four signals comprising a transmit audio signal, a transmit return signal, a receive audio signal and a receive return signal; and
  (b) when a second connector is present in the second connector receptacle, additionally communicating between the host telephone and the accessory item using additional signals propagated through the second connector, the additional signals providing additional communication links between the host telephone and the accessory item.

8. A method as in claim 7 wherein in step (b) the additional signals include a device presence signal, the device presence signal indicating to the host telephone an interface level, the interface level being determined by the functionality implemented by the accessory item.

9. A method as in claim 8 wherein step (b) includes the following substep:
- (b.1) when the device presence signal indicates a first interface level, communicating between the host telephone and the accessory item using the following additional signals propagated through the second connector:
  - a power source signal by which the host telephone supplies power to the accessory item;
  - a hookswitch signal originating from the accessory item which indicates to the host telephone a request for the accessory item to be placed in an off-hook state; and,
  - a discrete logic signal by which the host telephone indicates a ring to the accessory item.

10. A method as in claim 9 wherein step (b) additionally includes the following substep:
- (b.2) when the device presence signal indicates a second interface level, communicating between the host telephone and the accessory item using the following additional signals propagated through the second connector:
  - the power source signal by which the host telephone supplies power to the accessory item; and
  - a bi-directional serial communication link between the host telephone and the accessory item.

11. A method as in claim 7 wherein in step (a) the first connector is an RJ-8 style modular connector having four pins, and in step (b) the second connector is an RJ-11 style modular connector having six pins.

12. A method as in claim 7 wherein in step (b) the additional signals include a second audio channel for the attachment of stereo headsets.

13. A connection interface for use in a telephone system to connect a host telephone to an accessory item, the connection interface comprising:
- first connector which connects the connection interface to the host telephone, the first connector used as part of a connection medium between the host telephone and the accessory item, four signals being propagated through the first connector, the four signals comprising a transmit audio signal, a transmit return signal, a receive audio signal and a receive return signal; and
- second connector which connects the connection interface to the host telephone, the second connector used as part of a connection medium between the host telephone and the accessory item, additional signals being propagated through the second connector, the additional signals providing additional communication links between the host telephone and the accessory item.

14. A connection interface as in claim 13 wherein the additional signals include a device presence signal, the device presence signal indicating to the host telephone an interface level, the interface level being determined by the functionality implemented by the accessory item.

15. A connection interface as in claim 14 wherein when the device presence signal indicates a first interface level, the additional signals additionally include:
- a power source signal by which the host telephone supplies power to the accessory item;
- a hookswitch signal originating from the accessory item which indicates to the host telephone a request for the accessory item to be placed in an off-hook state; and,
- a discrete logic signal by which the host telephone indicates a ring to the accessory item.

16. A connection interface as in claim 15 wherein when the device presence signal indicates a second interface level, the additional signals additionally include:
- the power source signal by which the host telephone supplies power to the accessory item; and
- a bi-directional serial communication link between the host telephone and the accessory item.

17. A connection interface as in claim 13 wherein the first connector is an RJ-8 style modular connector having four pins, and the second connector is an RJ-11 style modular connector having six pins.

18. A connection interface as in claim 13 wherein the additional signals include a second audio channel for the attachment of stereo headsets.

* * * * *

UNITED STATES PATENT AND TRADEMARK OFFICE
CERTIFICATE OF CORRECTION

PATENT NO. : 5,825,873
DATED : October 20, 1998
INVENTOR(S) : Michael G. Duncan; Geoffrey Findley, Ronald A. Kubena, and Douglas F. Moellering It is certified that error appears in the above-identified patent and that said Letters Patent is hereby corrected as shown below:

On the title page, after the first occurrence of the word "telephone" delete the following: "PROVIDING CALL CONTROL FOR A HEADSET ATTACHED TO A TELEPHONE." The correct title should be "INTERFACE FOR PROVIDING CALL CONTROL FOR A HEADSET ATTACHED TO A TELEPHONE."

Signed and Sealed this

Eleventh Day of May, 1999

Attest:

Q. TODD DICKINSON

*Attesting Officer*      *Acting Commissioner of Patents and Trademarks*